United States Patent [19]

Dolan

[11] Patent Number: 4,927,006

[45] Date of Patent: May 22, 1990

[54] INTERNALLY STABILIZED SLIDE CONVEYOR

[75] Inventor: Michael S. Dolan, Denver, Colo.

[73] Assignee: Serpentix Conveyor Corporation, Westminster, Colo.

[21] Appl. No.: 250,939

[22] Filed: Sep. 29, 1988

[51] Int. Cl.⁵ .............................................. B65G 11/10
[52] U.S. Cl. ...................................... 198/822; 198/841
[58] Field of Search ............... 198/839, 840, 841, 820, 198/821, 822, 835, 838, 852, 831

[56] References Cited

U.S. PATENT DOCUMENTS

| | | | |
|---|---|---|---|
| 2,543,368 | 2/1951 | Jones et al. | 198/840 |
| 2,757,786 | 8/1956 | Grebe | 198/821 X |
| 3,910,404 | 10/1975 | Henrekson | 198/835 |
| 4,144,965 | 3/1979 | Alldredge et al. | 198/838 |
| 4,358,010 | 11/1982 | Besch | 198/838 |
| 4,422,544 | 12/1983 | Alldredge | 198/838 |
| 4,438,842 | 3/1984 | Alldredge et al. | 198/838 |

FOREIGN PATENT DOCUMENTS

| | | | |
|---|---|---|---|
| 0969122 | 4/1958 | Fed. Rep. of Germany | 198/822 |
| 0590147 | 3/1959 | Italy | 198/852 |
| 0548495 | 3/1977 | U.S.S.R. | 198/838 |

Primary Examiner—Robert J. Spar
Assistant Examiner—James R. Bidwell
Attorney, Agent, or Firm—Kyle W. Rost

[57] ABSTRACT

A conveyor section has a belt supported above a slide channel in which the pulling chain moves. A laterally extending plastic stabilizer is connected to the chain and is received in a slot at the sides of the channel. The channel is constructed with steel sides and overhead lip and with a plastic bottom wall, such that the chain and stabilizer operate with dissimilar materials in contact at substantially all times.

17 Claims, 3 Drawing Sheets

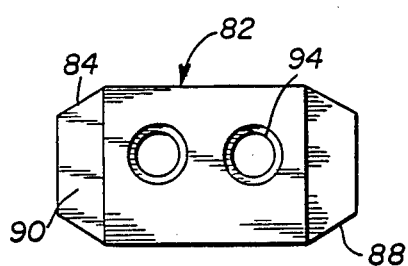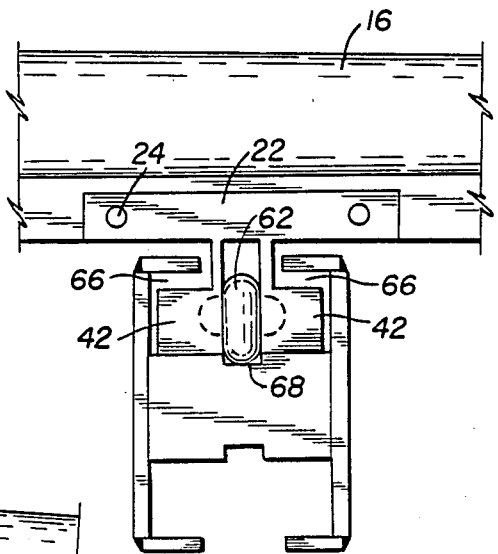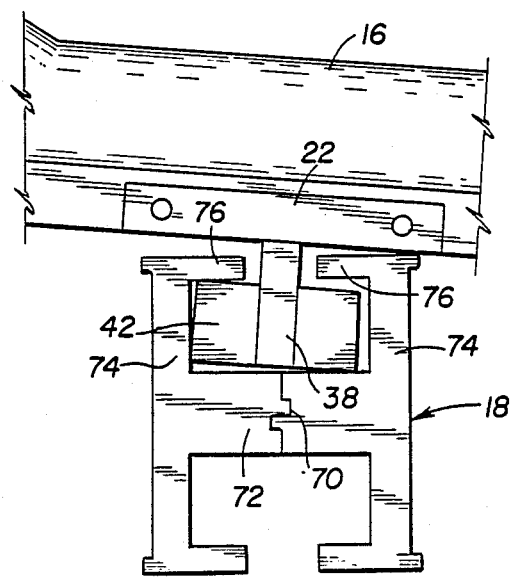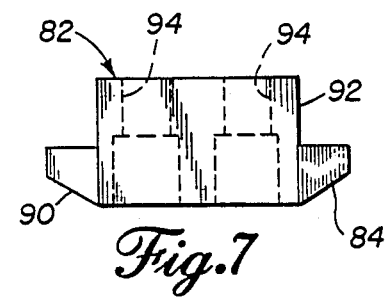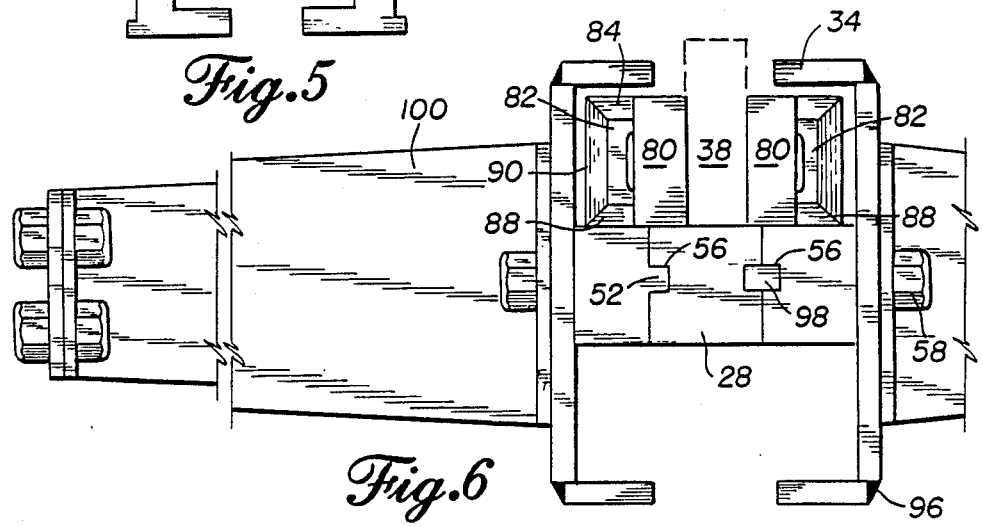

INTERNALLY STABILIZED SLIDE CONVEYOR

BACKGROUND OF THE INVENTION

1. Field of the Invention

The invention generally relates to power driven conveyors. More specifically, the invention relates to a conveyor section of an endless conveyor and to the support, guide, or hold-down means for the carrier belt, especially to a means slidably supporting the belt.

2. Description of the Prior Art

Conveyor belts adapted to move along a curved path are disclosed in U.S. Pat. No. 2,701,050 to Steinborn, U.S. Pat. No. 2,836,283 to Horth, U.S. Pat. No. 3,169,631 to Knappe, and U.S. Pat. No. 4,144,965 to Alldredge et al. The conveyors of those patents, which are manufactured under the Serpentix trademark, are supported on laterally spaced multiple rollers at various points along the length of the conveyor belt and follow a pair of laterally spaced apart, channel shaped steel rails that define the conveyor path. A central chain pulls the conveyor on the rollers. Since the load is carried on rollers that are widely displaced from the single chain on the centerline, this type of conveyor does not present lateral stability problems, but there may be chording problems in horizontal and helical turns.

In addition, the above noted patent to Alldredge et al. discloses flexible rail sections that employ a series of short steel rail segments that are linked to each other by mating tongues in order to provide a continuous pathway over a curved rail section. These multi-rail, roller type conveyors with convoluted belt are well suited for heavy duty applications and provide a valuable industrial advantage through their ability to follow a curved path. However, their construction through helical and other curved sections can require considerable technical skill and precision to ensure that the track sections are properly aligned and smooth.

A further U.S. Pat. No. 4,422,544 to Alldredge discloses a centerline pull chain conveyor in which the chain carries rollers that engage a centerline, cruciform channel. A pair of mirror-image steel side sections define the channel and are bolted to a common steel web below the channel. This type of conveyor is easier to construct than the previously mentioned roller type, since only one rail or channel is necessary to define each curve. Also, this type of conveyor operates with low friction and can negotiate a large degree of curvature in its pathway.

Another type of Serpentix conveyor adapted to follow a curved path and employing the same style of belt is disclosed in U.S. Pat. No. 4,438,842 to Alldredge et al. This type of conveyor is a slide or drag conveyor, in which a convoluted belt that carries the material being conveyed is above a single chain. The chain both pulls the load and prevents the loaded belt from tipping to one side sufficiently to spill the load to the side. In the preferred embodiment, the belt rides on a single-bar supporting link of a conveyor chain that employs single-bar links alternating with double-bar links, all of which slide through a single, centerline, guiding channel. The chain, rather than rollers, bears the weight of the load and prevents the load from tipping. This single-bar link is free to twist and tilt sideways until it reaches the alternating double-bar links. As the double-bar links begin to restrain the twisting, the stabilizing lever arm is transferred from the outer lower edge of the single link to the outer lower edge of the double link, which provides a longer lever arm because the double-bar links are wider than the single-bar links. In some applications the single-bar links are limited in the amount of twisting by contacting the sides of the lip on the slide channel. Where tilting of the belt must be kept to a minimum, small rollers can be installed inside or outside the slide channel to provide a longer lever arm.

The centerline channel is considerably easier to construct than the rails of the roller type conveyors, and this slide channel conveyor also has the ability to follow a curved path. However, the load bearing capacity of a slide conveyor generally will be lower than that of a conveyor riding on rollers, and the total degree of curvature may be more limited. Nevertheless, this type of conveyor is well suited to many applications and has advantages in cost and ease of fabrication.

In another commercially available design that is similar in structure to the patented centerline slide conveyor, the conveyor belt is connected to a plastic attachment, which is bolted to the single-bar link of the chain. Lateral extensions or runners on the plastic attachment prevent the fastening bolt from reaching and cutting the plastic sides of the slide channel. The resistance to tilting is provided on part by the feature that the single-bar link reaches and bears upon the double-bar link; and twisting of the double-bar link is limited because of the snug fit of the double-bar link in the slide channel.

Generally speaking, in a slide channel conveyor of the types described, the basic design problem is stabilization. The problem of supporting a relatively wide belt above a relatively narrower central carrier chain requires that there be horizontal axis stabilization. Thus, it is desirable to provide improved and less costly techniques of preventing the conveyor belt from tipping excessively.

To achieve the foregoing and other objects and in accordance with the purpose of the present invention, as embodied and broadly described herein, the conveyor channel and method of manufacture of this invention may comprise the following.

SUMMARY OF THE INVENTION

Against the described background, it is therefore a general object of the invention to provide an improved slide conveyor with overhead belt supported over a drag chain that operates in a channel, in which the stabilization is provided by contact between the channel and riding blocks that are attached to the chain.

A more specific object is to provide sufficient stabilization within the slide channel that wider conveyor belts can be used than has been possible with the containment of a normal chain in a channel.

A further object is to provide an improved channel structure that takes advantage of the presence of plastic lateral stabilizers on the chain by employing metal channel sides, making the channel simple and inexpensive to fabricate.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a conveyor is constructed having a conveying surface capable of carrying a bulk load along a longitudinal path. A track assembly provides a generally horizontal, longitudinally extending guide surface located below the conveying surface; a longitudinally extending side wall, extending upwardly from the guide surface; and a longitudinally extending lip attached to the side wall at a position spaced above the guide surface and below the conveying surface, overhanging a portion of the guide surface and defining a slot between the guide surface and the lip. An elongated pulling element is operable over the guide surface, and a joining means is associated with the pulling element for connecting the pulling element to the conveying surface. A laterally extending stabilizer is connected to the pulling element and is received in the slot between the guide surface and the lip. The stabilizer is of sufficient size with respect to the slot that when twisting forces are applied to the pulling element, the stabilizer is tilted into contact with an inner surface of the slot.

According to another aspect of the invention, a conveyor section formed of curved track channel is fabricated by cutting and rolling metal track sides and lips to the desired radius of the curved section and then welding these metal components together. The bottom wall of the channel is formed of a plastic plank, which is bent to the curvature of the sides and lips. Aligned holes are formed through the sides and the plank, after which the sides and plank are bolted together, with the bolts serving as dowels that hold the plank in the curvature established by the sides.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 4 is a view similar to FIG. 2, but showing the alternate chain of FIG. 3 and a modifed channel.

FIG. 5 is a view similar to FIGS. 1 or 3, but showing showing a variation of the tilt limiting chain enclosure.

FIG. 6 is a view similar to FIGS. 2 or 4, but showing details of the chain and block as well as of the track support assembly.

FIG. 7 is a top view of the riding block.

FIG. 8 is a side view of the riding block.

DESCRIPTION OF THE PREFERRED EMBODIMENTS

The present invention primarily is directed to an improved belt conveyor of the type known as a slide conveyor or drag conveyor. More specifically, it is directed to a conveyor having a central or centerline sliding surface that supports the load and moves with respect to a track that defines the pathway to be followed by the belt. Still more specifically, the conveyor employs a conveying surface capable of carrying a bulk load, for example a load-carrying belt that is carried above the sliding surface, which bears substantially the full weight of the belt and of the carried load at least when the conveyor belt is moving in laterally balanced condition. Typically, the belt is pulled by a chain, and a portion of the chain or an appurtenance to the chain may constitute the sliding surface.

U.S. Pat. No. 4,438,842 describes the full construction of one such conveyor and is incorporated by reference for its teachings. As disclosed in the referenced patent, conveyors of this structure have the capability of following a horizontally curved pathway, as well as the more typical capability of following vertical curves. The ability to support and operate the conveyor along a centerline pathway provides a substantial benefit in simplicity of design and fabrication, light weight, and simple assembly.

Figure 1:
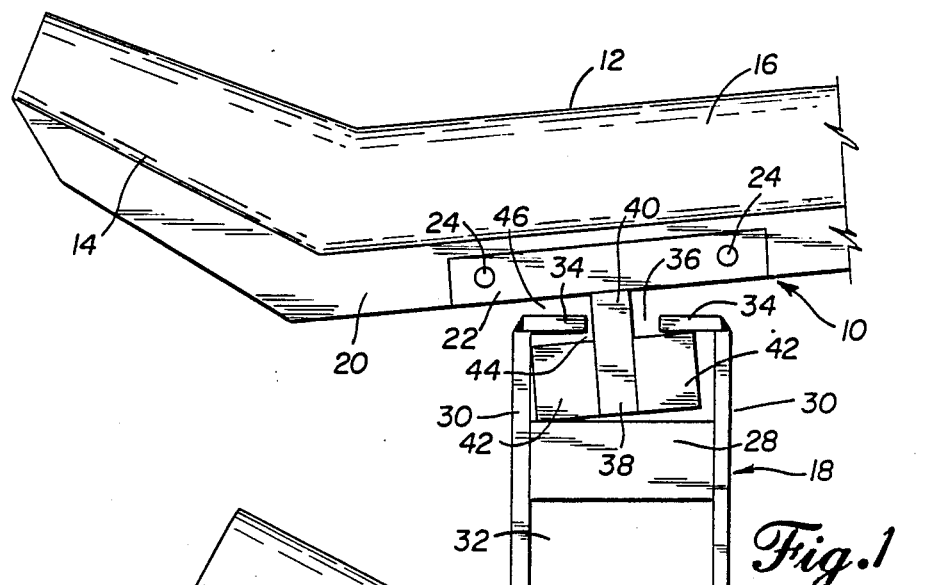
FIG. 1 is a transverse vertical cross-sectional view taken across the longitudinal axis of conveyor movement and showing the chain in check while tilted.

With reference to FIG. 1 of the drawings, the conveyor is a slide-channel, below-the-load, bulk conveyor 10 that employs a belt 12, which is preferred to be of the known type having troughed cross-section defined by upwardly angled lateral edges 14 and transverse convolutions 16, generally at right angles to the longitudinal direction of conveyor travel. Convoluted belts of this type are able to negotiate both horizontal and vertical curves, as may be required by the pathway established by the configuration of the conveyor track assembly 18. The belt 12 may be constructed from individual sections or pans, each of which has a rib or stiffener 20 extending transversely along each longitudinally facing end, which allows the pans to be assembled into a complete, endless belt by bolting together the juxtaposed stiffeners of adjacent pans. A carriage 22 or other joining means may be joined to the belt at the stiffeners by any suitable fasteners, such as bolts 24. The carriage interconnects the belt to the chain or like sliding element. Convoluted belts of the type described typically are driven by a sprocket drive that engages the conveyor pulling chain at one end of the track assembly. The belt passes around the end sprocket, at which point the convolutions are at least partially flattened out.

The track assembly 18 provides a hollow, upper run channel with respect to which the sliding element is moved. This channel is defined by a generally horizontal, longitudinally extending guide surface, such as bottom wall 28 that bears the weight of the conveyor belt and its load and is located below the conveying surface or belt. A pair of generally upstanding side walls 30 laterally bound the channel and, optionally, may extend below the bottom wall to define the lateral boundries of a lower, return run channel 32. The side walls follow the longitudinal path of the bottom wall and are angled upwardly from the bottom wall at from an angle that may range from acute through perpenticular, with perpenticular side walls being preferred. A pair of longitudinally extending block stops, lips or flanges 34 are attached to the side wall at a position spaced above the guide surface 28 and below the conveying surface. For example, the lips 34 may be attached to the tops of the side walls and extend centrally over a partial side portion of the channel's top so as to overhang a portion of the guide surface, defining between each lip and the guide surface a slot and defining between the opposite lips a longitudinal opening 36 that allows passage of the vertical extension 40 between the belt and chain. A similar pair of flanges may extend mutually inwardly from the bottom of the side walls, partially covering the open bottom of the lower run channel, if present. The flanges extend inwardly from the side walls at an angle that may range between acute to perpendicular, with horizontal flanges being preferred. A portion of the slot is on each lateral side of the channel and, thus, is on each lateral side of the conveyor's centerline.

Inside the channel, an elongated conveyor pulling element 38 extends along the longitudinal pathway defined by the track assembly, generally along the centerline of the conveyor. Typically, this pulling element may be a cable or a chain of any description, although it is preferred to employ a chain having links through which the teeth of a sprocket drive can be inserted. Typically, chain can be characterized as having two types of links, such as vertically and horizontally disposed links. Either type of link, and preferably the vertical link, may be employed to be connected to the belt carriage 22. Such a link may be regarded as being the load-supporting link. The pulling element or chain should be capable of following the established conveyor pathway of the slide channel. It is preferred that the chain be able to follow both horizontal and vertical curves.

One preferred, known type of chain is formed of flat bottomed links. The links include two types, wherein a central vertical plate defines alternating center-bar or block links. Each center-bar link may be joined to the carriage 22, such as by a vertical extension 40 that passes upwardly from the channel and through the slot 36 to the carriage. The center-bar links are joined together by alternating side-bar links formed of two vertical plates that are connected at opposite ends by a pin, which also passes through a sandwiched end of a juxtaposed center-bar link. Chain similar to that described is disclosed in U.S. Pat. No. 3,093,235 to Imse, incorporated by reference for its disclosure. However, still other types of chain are capable of being used with the improved conveyor. For example, the center-bar link may be composed of one or more vertical plates. Likewise, the side-bar links may be formed of more than two vertical plates. Alternatively, the center-bar link or links may be joined by adjoining links of one or more bars on one or both outer sides of the center-bar or bars.

One aspect of the improvement is the addition of a horizontal, laterally extending stabilizer 42 or riding block to one or both sides of the pulling element, such at to the load-supporting link, which is preferred to be the vertical link. The stabilizer is received in the slot formed between the lip and guide surface. With this addition, the conveyor gains extra stability and a smaller angle of tipping can be maintained. For purposes of illustration, with the convoluted type of belt mentioned above, it has been found possible to use a 32 inch wide belt where a 26 inch wide belt previously was employed. For practical purposes, a conveyor may be termed "stabilized" when the conveying surface cannot be tipped sufficiently by its design loading as to spill the materials or items conveyed on the conveying surface.

With the addition of the stabilizer, the conveyor is better able to maintain the smaller degree of tilt, as when twisting forces are applied to the pulling element, the stabilizer is tilted into contact with an inner surface of the slot. In FIG. 1, the conveyor belt is shown to be in tilted position, such as might result if a carried load became laterally unevenly weighted on the belt. The belt is shown with its tilt in check and is stabilized by the right hand riding block, which has its upper surface in contact with the right hand flange 34 or block stop. In addition, the left hand block has its lower edge in contact with the bottom wall 28 of the channel. Further, it may be seen in the drawing that the left hand block has its outside lateral wall against the left side wall of the channel. Depending upon the exact lateral position of the chain in the channel, it is clear that the right hand wall could, in the alternative, have its outside lateral wall against the right hand side wall of the channel. Thus, the tilting of the chain 38 is checked by the contact between the horizontally extending riding blocks and the interior walls of the channel.

In the particular configuration of FIG. 1, it is notable that the conveyor belt and chain are shown in the leftmost position with respect to the track assembly. In this position, a clearance 44 continues to exist between the vertical extension 40 and the inside edge of the left hand block stop. Similarly, a clearance 46 continues to exist between the top edge of the left hand block stop and the bottom of the belt stiffener 20 or carriage attachment 22. The riding blocks and channel are sized to assure that at the maximum allowable tilt of the chain, there will be no undesirable contact between the track assembly and the moving structures. In addition, the stabilizer and channel are sized with respect each other and to the belt such that the width of the stabilizer is at least eight percent of the distance from the centerline of the pulling element to a lateral side of the belt.

A still further aspect of the improvement is the construction of the track assembly from materials that enhance the operation and life of the conveyor. The preferred structure employs sheets of steel or stainless steel for side walls 30 and for block stop flanges 34. Thus, these members may be joined together by welding at the top and bottom edges of the side walls. The bottom wall 28 of the channel may employ a plank of synthetic plastic material, such as ultra high molecular weight polyethylene, or at least the upper, load-bearing surface of this wall may be such plastic.

The materials and orientation of the chain and riding blocks also contribute to the operation of the conveyor. The chain typically is formed of steel or other metal. The riding blocks 42 are formed of synthetic plastic material, which may be the same plastic as the channel bottom. The blocks may be bolted to the chain in pairs such that they extend beyond the outermost lateral surfaces of the wider, horizontal or double-bar links of the chain. The height of the blocks 42 may be similar to or shorter than the height of the chain links.

Figure 2:
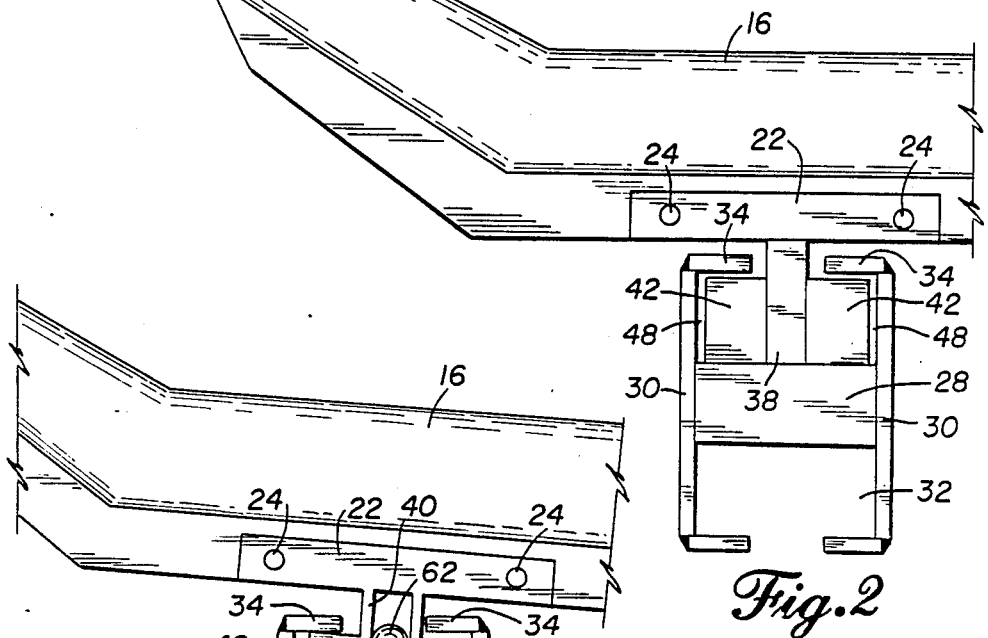
FIG. 2 is a view similar to FIG. 1, but showing the chain riding flat.

In the configuration of FIG. 2, which shows the conveyor in its normal, laterally balanced position, the materials and orientation of parts results in the bottom surface of the moving steel chain 38 sliding over the top surface of the polyethylene plank 28. Moreover, the outside faces 48 of the plastic riding blocks 42 are contactable and slidable against the steel surfaces of the sides 30 of the slide channel. An important achievement of this arrangement is that no similar-material surfaces slide in contact with each other. As a result, this arrangement prevents galling of the type that can occur when smooth, similar materials do slide over each other. When the conveyor belt tips to one side, as illustrated in FIG. 1, the upper edge of one riding block 42 is restrained by the inside metal surface of the adjacent channel side 30 or lip 34, and the lower edge of the opposite block 42 can be restrained by the inside metal surface of the side 30 of the opposite channel or by the plank 28 below it.

The conveyor belt is capable of following the track assembly 18 through both straight and curved sections.

On a curve, the belt may remain in stable position similar to that shown in FIG. 2, except that the moving portions of the conveyor tend to be shifted laterally with respect to the track assembly toward the inside radius of the curve. When the curve is horizontal, the radially inside riding block 42 will have its outward-facing lateral surface 48 riding against the the inner face of the steel side panel 30. When the track forms a convex vertical curve, the flat metal bottom of the vertical chain link 38 is forced firmly against the plastic surface of the plank 28. On a concave vertical curve, both plastic riding blocks 42 may slide against the metal surfaces of the block stop flanges 34 overhanging the channel.

Figure 3:
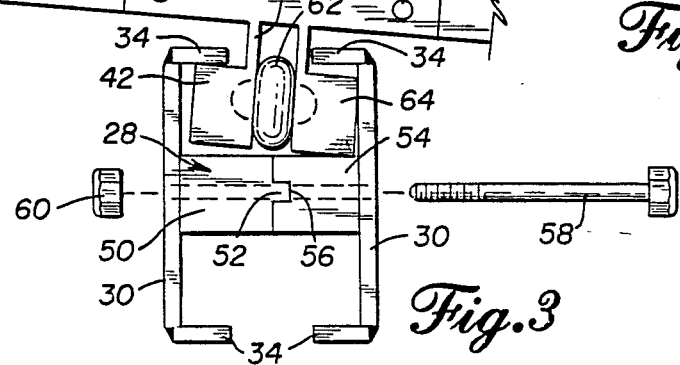
FIG. 3 is a view similar to FIG. 1, but showing an alternate chain and block design.

The plastic plank 28 may be formed as a single piece, as shown in FIGS. 1 and 2, or the bottom wall of the channel may be assembled from two or more pieces, as shown in FIG. 3. When the bottom wall is formed of a plurality of pieces, the various pieces may be keyed together. For example, in FIG. 3 the left hand plank section 50 is provided with a longitudinal tongue 52, while the right hand plank section 54 is provided with a mating groove 56. When the tongue and groove joint is assembled, the resulting plank 28 has an improved lateral bending ability due to the longitudinal displacement that is possible along the joint. Thus, horizontal and helical curves can be fabricated more easily with planks assembled from two or more pieces.

Horizontal curves can be generated by rolling the vertical sides 30 to the required radius and welding on lips 34, which are cut to that radius. Holes then are drilled through the metal sides 30 and correspondingly spaced transverse holes are drilled laterally through the plank. The several pieces of the plank 28 may be bent by hand to conform to the curvature of the sides, after which the sides and plank joined by suitable fastening means such as bolts 58 and nuts 60. The matching holes in the plank 28 and in the sides 30 can be of a diameter close to the diameter of the bolts 58. Thus, the bolts can serve as dowels to maintain the alignment of the sides and plank.

Vertical curves can be generated by cutting the vertical metal sides 30 to the required radius and rolling the lips 34 to the required curvature before welding the two together. A single piece or multi-piece plank is bent by hand to conform to the curvature of the sides 30, after which the sides and plank are drilled and bolted together.

The general preferred embodiment may be modified by a number of alternative structures. As mentioned above, the chain 38 need not be of the flat bottomed, bar link variety, but may be the conventional eliptical or round bar link chain 62, shown in FIGS. 3 and 4. Discrete riding blocks 42 may be bolted to one of the chain links, such as the vertical link, as previously described. Further, the riding blocks 42 may be formed in a single piece 64, FIG. 3, with the vertical connector 40 and, if desired, other parts of the carriage 22. Also, the stiffener 20 may be included as a part of this piece.

Other variations may be incorporated into the channel, which has been shown as rectangular. Other channel shapes may be topologically the same or equivalent. For example, the channel may be made in a cruciform design, as shown in FIG. 4, in which the riding blocks 42 are located in laterally extending slots 66, while the vertical link of the chain rides in a vertically dropped slot 68, while the blocks extend as wings operating in separate side channels.

In another variation shown in FIG. 5, the entire channel may be defined by a track 18 of a single material, such as plastic. The channel may be formed of a single piece of plastic or may be divided, such as by a double tongue and groove joint 70 that goes through the bottom wall 72 of the channel. In this embodiment, the slide channel is formed of not only the plastic bottom wall 72, but also plastic sides 74 and plastic lips 76. The chain is preferred to be metal, and, if desired, the riding blocks 42 also may be of metal. Thus, while the preferred design employs metal chain against a plastic slide bottom surface and plastic riding blocks against metal channel sides and lips, other combinations are possible. For example, all the contacting surfaces may be metal, plastic or a combination of these materials. It is desired and preferred that any moving part of metal slides on a fixed part of plastic or, at least, a fixed part of some different material; and any moving part of plastic slides on a fixed part of metal.

The stabilization can be provided by a variety of relationships between the riding blocks and the channel. For example, the heights of these elements will provide stabilization when the lower edge of the chain or a block on a first lateral side of the chain may ride against the bottom of the slide channel and the upper edge of the chain or block on the opposite lateral side of the chain may ride against the inside surface of the overhanging lip of the slide channel, as shown in FIGS. 1, 3, and 5. Also, the stabilization can be provided by the relative widths of these elements when a lower side edge on the chain or block on a first lateral side of the chain rides against one side of the slide channel and an upper, opposite side edge on the chain or block rides against the inner surface of the opposite side of the slide channel. In either situation, it has been found that the least dimension from one of the contacting edges of the chain or block to the other of the contacting edges should be at least eight percent of the dimension from the centerline of the chain to the closest outer side of the conveyor belt.

It is desired and preferred that the load, i.e., the belt with any materials carried thereon, be carried on and stabilized on the same link of the chain. However, it is possible for additional links of the chain to contribute to the stabilization, which will result when three points of the moving elements of the conveyor have contacted any number of the surfaces of the fixed, track elements or slide surfaces.

In a single example of the detailed, preferred embodiment of the invention, FIG. 6 shows the conveyor chain to be of the type previously described as having links formed from metal plates, wherein the vertical, center-bar link 38 is lapped by a pair of side-bar link plates 80. The center link carries a pair of plastic riding blocks 82 as oppositely extending lateral appurtenances. These blocks are shown in greater detail in FIGS. 7 and 8, wherein each block is shown to have tapered longitudinal ends of upper surfaces 84, lower surfaces 88 and laterally outside surfaces 90. The tapered surfaces guide the stabilizers smoothly over irregularities in the channel, such as the junctions between channel sections. On the inside faces of the blocks 82 are support bases 92 that that are longitudinally shorter than the outer portions of the blocks. These shorter bases are inserted into the gaps or recesses adjacent the side faces of the center-bar, vertical links 38, between the wider side-bar, horizontal links. The support bases 92 are shaped to fit within the existing interlink space, regardless of what type of chain may be used. The longer, outermost portions of the stabilizer blocks overlap the ends of the adjoining side-bar links. Bolt holes 94 are formed laterally through the blocks 82 and permit a pair of blocks to be fastened securely to each vertical link via bolts passing through the blocks and link.

Figure 9:
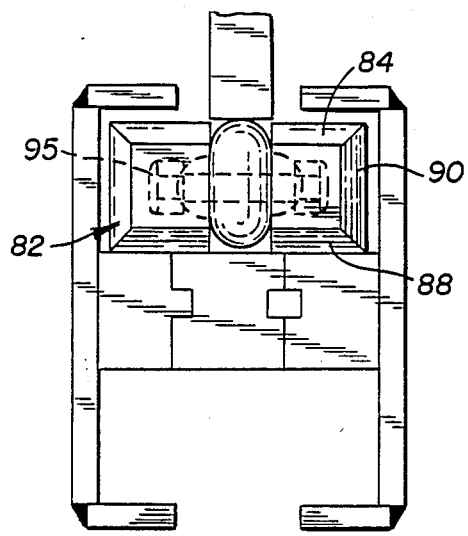
FIG. 9 is a view similar to FIG. 3, but showing the riding block of FIGS. 7 and 8.

FIG. 9 shows an embodiment of the invention in which the longitudinal pulling element is a chain having links generally disposed in alternate vertical and horizontal positions. The stabilizer member is a pair of plastic blocks 82 sized to fit with one block against each lateral side of a vertical link, and a fastening member such as bolt 95 holds the pair of blocks to the link.

The track of the preferred embodiment includes vertical steel side plates 30 and perpendicular steel edge flanges 34 held by a weldment 96 to the top and bottom edges of the side plates. The central synthetic plastic plank 28 forming the bottom wall of the track is joined to the side plates by bolts 58. The plank is formed of a plurality of longitudinally divided sections, keyed together by any suitable joint, such as by tongue 52 and groove 56 at the left hand joint as shown in the figure, or by a common key 98 received in a pair of facing grooves 56, as shown in the right hand joint.

The track is carried by laterally extending steel supports 100, which may be mounted to any suitable fixed structures. However, the conveyor is capable of being configured for many different requirements and locations. It may include only one of the channels, for example only a top channel or only a bottom channel, or both type of channels may exist in a single installation, but at nonunified locations. In any of these situations, the supports may be lateral, as shown in FIG. 6, or the track may be carried on an underlying or overhead surface, such as on the flange of a beam.

Furthermore, the channel may be only partially present in locations where the forces on the track are reliably known and the design provides a surface against which the forces on the chain can be placed so that the loaded surface is inhibited from tipping beyond the point that would spill the supported load. For example, on a horizontal curve, the radially outside wall of the top slide channel may be eliminated, since the inside wall bears the force. Through a straight run of the top supporting channel, a side 30 need be present only alternately on opposite sides or on one side, and in certain, selected applications, the vertical sides need not be present at all.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The embodiments of the invention in which an exclusive property or privilege is claimed are defined as follows:

1. A conveyor, comprising:
 a conveying surface capable of carrying a bulk load along a longitudinal path;
 a track assembly including:
  a generally horizontal, longitudinally extending guide surface located below the conveying surface;
  a longitudinally extending side wall, extending upwardly from said guide surface; and
  a longitudinally extending lip attached to said side wall at a position spaced above the guide surface and below the conveying surface, overhanging a portion of the guide surface and defining a slot between the guide surface and the lip;
 an elongated pulling element comprising a chain formed of alternating vertical and horizontal links and operable over said guide surface;
 a joining means associated with the pulling element for connecting the pulling element to the conveying surface; and
 a laterally extending stabilizer comprising first and second blocks, each attached to an opposite lateral side of said chain, received in said slot between the guide surface and said lip, the stabilizer being of sufficient size with respect to the slot that when twisting forces are applied to the pulling element, the stabilizer is tilted into contact with an inner surface of the slot.

2. The conveyor of claim 1, wherein:
 said vertical links of said elongated pulling element comprise single-bar links, and said horizontal links of said elongated pulling element comprise double-bar links; and
 said stabilizer blocks are attached to opposite lateral sides of a single-bar link by a fastening element passing through the single bar link.

3. The conveyor of claim 1, wherein said guide surface is disposed along the centerline of the conveyor and the track assembly comprises a side wall and lip along each lateral side of said guide surface such that said pulling element is received generally along the centerline of the conveyor and said slot has a portion on each lateral side of the centerline; and
 said stabilizer extends laterally on both sides of the pulling element and into both side portions of the slot, such that when a twisting force is applied to the pulling element, an edge of the stabilizer on a first side of the pulling element is contacted with an inner or upper face of the slot portion on a first lateral side of the pulling element, and an edge of the stabilizer on the second side of the pulling element is contacted with an inner or lower face of the slot portion on the second lateral side of the pulling element.

4. The conveyor of claim 1, wherein said stabilizer blocks are attached to the vertical links of the chain.

5. The conveyor of claim 1, wherein said stabilizer blocks are configured with a tapered surface at the longitudinally extending end of their laterally outside surface.

6. The conveyor of claim 1, wherein said stabilizer blocks are configured with a tapered surface at the longitudinally extending end of their upper surface.

7. The conveyor of claim 1, wherein said stabilizer blocks are configured with a tapered surface at the longitudinally extending end of their lower surface.

8. The conveyor of claim 1, wherein said guide surface has a longitudinal center portion dropped below the level of the laterally opposite side portions thereof, said center portion receiving the pulling element and the side portions of the guide surface underlying the stabilizer.

9. The conveyor of claim 1, wherein said pulling element comprises a chain formed of eliptical links.

10. The conveyor of claim 2, wherein the stabilizer blocks have a base longitudinally sized to be relatively shorter in order to fit between the bars of longitudinally spaced double-bar links and against the sides of the single-bar links, and the stabilizer blocks have a laterally outermost portion longitudinally sized to be relatively longer than the bases in order to overlap the end portion of the adjoining double-bar links.

11. An improved conveyor of the type having a load-conveying surface supported above a centerline guide channel that has a bottom wall, side walls on opposite lateral sides of the bottom wall, and a lip directed inwardly from each of the side walls, overhanging and spaced above a portion of the bottom wall and defining a longitudinal stabilizer slot between each lip and the bottom wall; and wherein the load-conveying surface is connected to a longitudinal pulling element comprising a chain having links generally disposed in alternate vertical and horizontal positions and located in the guide channel; the improvement comprising:

an internal stabilizing member joined to the pulling element and extending laterally into said stabilizer slot, said stabilizing member including at least one pair of plastic blocks sized to fit with one block against each lateral side of a vertical link and having a fastening member holding said block pair to the link; and wherein the stabilizing member is of sufficient size with respect to said slot that when twisting forces are applied to the pulling element, the stabilizer is moved into contact with an inner surface of the slot.

12. The conveyor of claim 11, wherein said blocks each have a tapered end on their outer side surface.

13. The conveyor of claim 11, wherein said blocks each have a tapered end on the top surface.

14. The conveyor of claim 11, wherein said blocks each have a tapered end on the lower surface.

15. The conveyor of claim 11, wherein:

said pulling element is a metal chain that slides against said bottom wall of the guide channel;

said stabilizing member has plastic surfaces facing the side walls of the stabilizing slots;

the bottom wall of the guide channel has an upper surface formed of synthetic plastic material; and the side walls of the stabilizing slots have inside surfaces formed of metal;

such that contact between the pulling member and bottom wall and between the stabilizing member and the side walls is metal to plastic contact.

16. The conveyor of claim 15, wherein the surface of said lips facing inward to the stabilizer channel are formed of metal.

17. The conveyor of claim 16, wherein:

said side walls extend upwardly from said bottom wall at an angle in the range from acute through perpendicular; and said lips extend centrally inwardly from the side walls at an angle, relative to the bottom wall, in the rangle from acute through parallel.

* * * * *